(12) United States Patent
Kogure et al.

(10) Patent No.: US 12,565,159 B2
(45) Date of Patent: Mar. 3, 2026

(54) WIRE HARNESS WIRING STRUCTURE, LINK TYPE SLIDE DOOR, AND WIRE HARNESS

(71) Applicant: Yazaki Corporation, Tokyo (JP)

(72) Inventors: Naoto Kogure, Shizuoka (JP); Hikaru Sano, Shizuoka (JP); Seiichi Sumiya, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 224 days.

(21) Appl. No.: 18/175,135

(22) Filed: Feb. 27, 2023

(65) Prior Publication Data

US 2023/0271575 A1 Aug. 31, 2023

(30) Foreign Application Priority Data

Feb. 28, 2022 (JP) ................................. 2022-028835

(51) Int. Cl.
B60R 16/02 (2006.01)
B60J 5/06 (2006.01)
B60R 16/027 (2006.01)
(52) U.S. Cl.
CPC ............. B60R 16/0215 (2013.01); B60J 5/06 (2013.01); B60R 16/027 (2013.01)
(58) Field of Classification Search
CPC ... B60R 16/027; B60R 16/0215; H02G 11/00; H02G 11/006
See application file for complete search history.

(56) References Cited

U.S. PATENT DOCUMENTS

| | | | | |
|---|---|---|---|---|
| 4,653,799 | A * | 3/1987 | Arai ......................... | B60J 5/047 49/248 |
| 5,879,047 | A * | 3/1999 | Yamaguchi ......... | B60R 16/0215 296/146.7 |
| 5,971,782 | A * | 10/1999 | Masuda ............. | G01D 5/34738 439/164 |
| 6,070,931 | A * | 6/2000 | Yamaguchi ......... | B60R 16/0215 296/146.7 |
| 11,738,626 | B2 * | 8/2023 | Sumiya ................ | E05D 15/101 296/146.12 |
| 2006/0254797 | A1 * | 11/2006 | Charara ................ | H02G 11/00 174/72 A |

(Continued)

FOREIGN PATENT DOCUMENTS

| | | |
|---|---|---|
| CN | 210478596 U | 5/2020 |
| DE | 10 2006 061 641 A1 | 7/2007 |

(Continued)

*Primary Examiner* — Paresh Paghadal
(74) *Attorney, Agent, or Firm* — Sughrue Mion, PLLC

(57) ABSTRACT

A wire harness wiring structure includes at least a main link arm and a wire. The main link arm has one end rotatably connected to the vehicle body and a different end rotatably connected to the door main body, and slidably supports the door main body with respect to the vehicle body while relatively rotating with respect to the vehicle body and the door main body. The wire is wired along the main link arm, and connects a connection target on the vehicle body side and a connection target on the door main body side. Then, the main link arm includes a groove portion that is formed into a groove shape along an extending direction in which the main link arm extends, and can accommodate the wire.

8 Claims, 4 Drawing Sheets

(56)     References Cited

U.S. PATENT DOCUMENTS

| 2007/0148994 | A1 |   | 6/2007 | Sato et al. | |
|---|---|---|---|---|---|
| 2007/0278820 | A1 | * | 12/2007 | Habering | B60R 16/0215 |
|   |   |   |   |   | 296/146.9 |
| 2017/0214228 | A1 | * | 7/2017 | Kawashima | H02G 3/0456 |
| 2018/0278033 | A1 | * | 9/2018 | Yamao | H02G 3/0418 |
| 2018/0370388 | A1 | * | 12/2018 | Nakamura | B60N 2/0224 |
| 2019/0232897 | A1 |   | 8/2019 | Tomosada et al. | |
| 2023/0126857 | A1 | * | 4/2023 | Saito | H02G 3/0468 |
|   |   |   |   |   | 174/72 A |
| 2024/0243560 | A1 | * | 7/2024 | Ashida | B60R 16/0215 |
| 2025/0140441 | A1 | * | 5/2025 | Tanaka | B60R 16/02 |

FOREIGN PATENT DOCUMENTS

| JP |   | 2007176233 | * | 7/2007 | B60R 6/02 |
|---|---|---|---|---|---|
| JP |   | 2007-252059 | A |   | 9/2007 | |
| JP |   | 2007283949 | A | * | 11/2007 | B60R 16/02 |
| JP |   | 2008-5589 | A |   | 1/2008 | |
| JP |   | 2019-134626 | A |   | 8/2019 | |
| WO |   | WO-2016114246 | A1 | * | 7/2016 | H02G 3/04 |

* cited by examiner

WIRE HARNESS WIRING STRUCTURE, LINK TYPE SLIDE DOOR, AND WIRE HARNESS

CROSS-REFERENCE TO RELATED APPLICATION(S)

The present application claims priority to and incorporates by reference the entire contents of Japanese Patent Application No. 2022-028835 filed in Japan on Feb. 28, 2022.

BACKGROUND OF THE INVENTION

1. Field of the Invention

The present invention relates to a wire harness wiring structure, a link type slide door, and a wire harness.

2. Description of the Related Art

For example, Japanese Patent Application Laid-open No. JP 2019-134626 A has conventionally described a wiring structure for a slide door. The wiring structure for a slide door includes a slide door including a slide portion to be guided by a guide portion provided on a vehicle body side, a flexible conductive member electrically connecting the slide door and the vehicle body side, and traversing a locus space through which the slide portion passes, and a plate-like elastic member arranged along the conductive member. On the other hand, in a case where a link type slide door moving in a sliding manner by a link arm fixing a slide door and a vehicle body is formed as a slide door instead of a slide door including a slide portion, it is demanded to properly ensure a space for wiring wires between the vehicle body and the slide door, for example.

SUMMARY OF THE INVENTION

Thus, the present invention has been devised in view of the foregoing, and aims to provide a wire harness wiring structure, a link type slide door, and a wire harness that can properly wire a wire.

In order to achieve the above mentioned object, a wire harness wiring structure according to one aspect of the present invention includes a link arm that has one end rotatably connected to a vehicle body and a different end rotatably connected to a door main body, and is configured to slidably support the door main body with respect to the vehicle body while relatively rotating with respect to the vehicle body and the door main body; and a wire that is wired along the link arm and configured to connect a connection target on the vehicle body side and a connection target on the door main body side, wherein the link arm includes a groove portion that is formed into a groove shape along an extending direction in which the link arm extends, and can accommodate the wire.

A link type slide door according to another aspect of the present invention includes a door main body to be assembled to a vehicle body; a link arm that has one end rotatably connected to the vehicle body and a different end rotatably connected to the door main body, and is configured to slidably support the door main body with respect to the vehicle body while relatively rotating with respect to the vehicle body and the door main body; and a wire that is wired along the link arm and configured to connect a connection target on the vehicle body side and a connection target on the door main body side, wherein the link arm includes a groove portion that is formed into a groove shape along an extending direction in which the link arm extends, and can accommodate the wire.

A wire harness according to still another aspect of the present invention includes a wire that is wired along a link arm that has one end rotatably connected to a vehicle body and a different end rotatably connected to a door main body, and is configured to slidably support the door main body with respect to the vehicle body while relatively rotating with respect to the vehicle body and the door main body, configured to connect a connection target on the vehicle body side and a connection target on the door main body side, and accommodated into a groove portion of the link arm that is formed into a groove shape along an extending direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
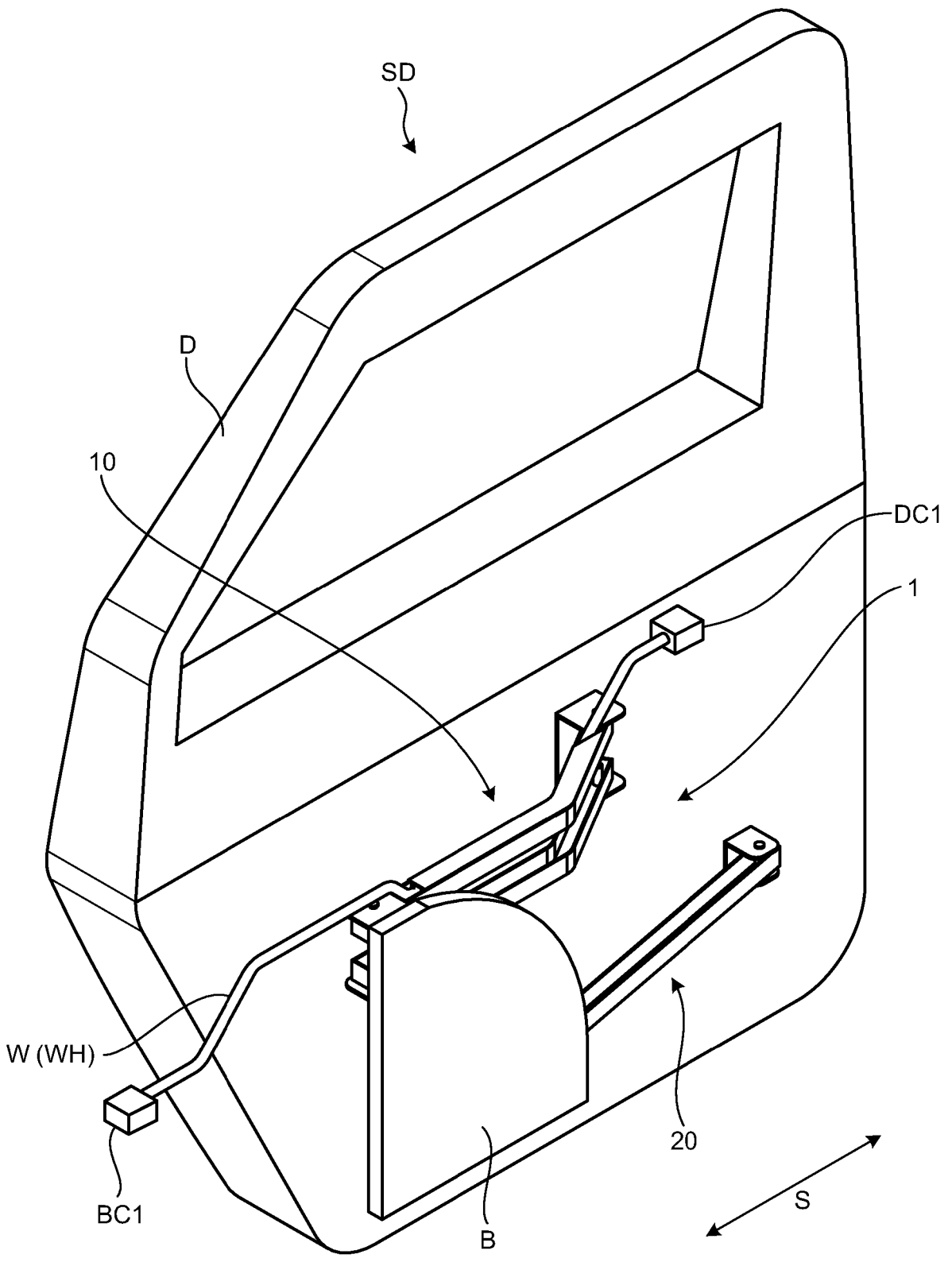
FIG. 1 is a perspective view illustrating a configuration example of a wire harness wiring structure according to an embodiment.

A mode for carrying out the present invention (embodiment) will be described in detail with reference to the drawings. The present invention is not limited by the content described in the following embodiment. In addition, components described below include the ones easily-conceived by those skilled in the art, or the ones that are substantially identical. Furthermore, configurations described below can be appropriately combined. In addition, various omissions, substitutions, or modifications of configurations can be performed without departing from the scope of the present invention.

Embodiment

A wire harness wiring structure 1, a link type slide door SD, and a wire harness WH according to an embodiment will be described with reference to the drawings.

Note that, in the following description, among a first direction, a second direction, and a third direction that intersect with each other, the first direction will be referred to as an "extending direction X", the second direction will be referred to as a "width direction Y", and the third direction will be referred to as a "height direction Z (intersecting direction Z)". The extending direction X, the width direction Y, and the height direction Z intersect with each other, and are typically orthogonal to each other. The extending direction X is a direction extending along a direction (long side direction) in which a main link arm 11 to be described later extends, for example. The width direction Y is a direction extending along a short side direction of the main link arm 11, for example. The height direction Z is a direction extending along a vehicle height direction (vehicle height direction) of a vehicle, and also is a direction extending along a vertical direction. A slide direction S of a door main body D is a direction extending along the extending direction X of the main link arm 11 in a state in which the door main body D is closed, and here, corresponds to a direction extending along an entire length direction of a vehicle body B. In other words, the slide direction S of the door main body D is a direction intersecting with a rotational axis (rotational axis portion 12*a*, 13*a* to be described later) of the main link arm 11, and is typically a direction orthogonal to the rotational axis. Each direction to be used in the following direction refers to a direction in a state in which components are assembled to each other, unless otherwise specified.

The wire harness wiring structure 1 is applied to a vehicle, and slidably supports the door main body D with respect to the vehicle body B of the vehicle along the slide direction S (the entire length direction of the vehicle body B), and electrically connects a connection target BC1 such as a device or a connector that is provided on the vehicle body B side, and a connection target DC1 such as a device or a connector that is provided on the door main body D side. As illustrated in FIGS. 1 to 4, the wire harness wiring structure 1 includes a wire W, a main link mechanism 10, a sub link mechanism 20, a cover portion 30, and a binding member 40. The wire W, the cover portion 30, and the binding member 40 constitute the wire harness WH. In other words, the wire harness WH can also be said to include the wire W, the cover portion 30, and the binding member 40. In addition, the door main body D, the main link mechanism 10, the sub link mechanism 20, the cover portion 30, the binding member 40, and the wire W constitute the link type slide door SD. In other words, the link type slide door SD can also be said to include the door main body D, the main link mechanism 10, the sub link mechanism 20, the cover portion 30, the binding member 40, and the wire W.

Here, the wire harness wiring structure 1 is a wiring structure to be employed when the door main body D is moved in a sliding manner along the slide direction S with respect to the vehicle body B without using a general sliding guide rail, by supporting the door main body D using the main link mechanism 10 and the sub link mechanism 20, and rotating the main link arm 11 and a sub link arm 21, which will be described later. Hereinafter, the wire harness wiring structure 1 will be described in detail.

The wire W connects the connection target BC1 provided on the vehicle body B side, and the connection target DC1 provided on the door main body D side. The wire W includes a power line for supplying power, a communication wire for performing communication, and the like. The wire W is wired between the vehicle body B and the door main body D, for example, and connects the connection target BC1 including a connector, a device, and the like on the vehicle body B side, and the connection target DC1 including a connector, a device, and the like on the door main body D side.

The main link mechanism 10 is a mechanism that slidably supports the door main body D with respect to the vehicle body B together with the sub link mechanism 20. The main link mechanism 10 includes the main link arm 11, a first connection portion 12, and a second connection portion 13.

The main link arm 11 is a member that slidably supports the door main body D with respect to the vehicle body B. The main link arm 11 includes a first arm 11*a* and a second arm 11*b*.

The first arm 11*a* is a metal member extending in the extending direction X and being formed into an elongated shape. The first arm 11*a* is formed into a shape including a bend portion bending from the vehicle body B side toward the door main body D side, for example. Note that the shape of the first arm 11*a* is not limited to such a bending shape as long as the first arm 11*a* can slidably support the door main body D with respect to the vehicle body B. The first arm 11*a* includes a bottom surface portion 11*h* and a pair of side wall portions 11*i*. The bottom surface portion 11*h* is a portion positioned on one side (lower side) in the height direction Z, and is formed into an elongated shape and a plate-like shape along the extending direction X. The pair of side wall portions 11*i* are each formed into an elongated shape and a plate-like shape along the extending direction X, erect along the height direction Z from both ends in the width direction Y of the bottom surface portion 11*h*, and are positioned along the width direction Y at a fixed interval. A different side (upper side) in the height direction Z of the bottom surface portion 11*h* of the first arm 11*a* is opened, and both end portions in the extending direction X are closed. The first arm 11*a* having such a configuration accommodates the wire W to be wired between the vehicle body B side and the door main body D side, into a groove portion 11*d* formed by being surrounded by the bottom surface portion 11*h* and the pair of side wall portions 11*i*, which will be described later.

The second arm 11*b* is formed similarly to the aforementioned first arm 11*a*. More specifically, the second arm 11*b* is a metal member extending in the extending direction X and being formed into an elongated shape. The second arm 11*b* is formed into a shape including a bend portion bending from the vehicle body B side toward the door main body D side, for example. Note that the shape of the second arm 11*b* is not limited to such a bending shape as long as the second arm 11*b* can slidably support the door main body D with respect to the vehicle body B. The second arm 11*b* is arranged adjacently to the first arm 11*a* along the height direction Z The second arm 11*b* includes a bottom surface portion 11*m* and a pair of side wall portions 11*n*. The bottom surface portion 11*m* is a portion positioned on one side (lower side) in the height direction Z, and is formed into an elongated shape and a plate-like shape along the extending direction X. The pair of side wall portions 11*n* are each formed into an elongated shape and a plate-like shape along the extending direction X, erect along the height direction Z from both ends in the width direction Y of the bottom surface portion 11*m*, and are positioned along the width direction Y at a fixed interval. A different side (upper side) in the height direction Z of the bottom surface portion 11*m* of the second arm 11*b* is opened, and both end portions in the extending direction X are closed. The second arm 11*b* having such a configuration can accommodate the wire W to be wired between the vehicle body B side and the door main body D side, into a groove portion 11*e* formed by being surrounded by the bottom surface portion 11*m* and the pair of side wall portions 11*n*, which will be described later.

Figure 2:
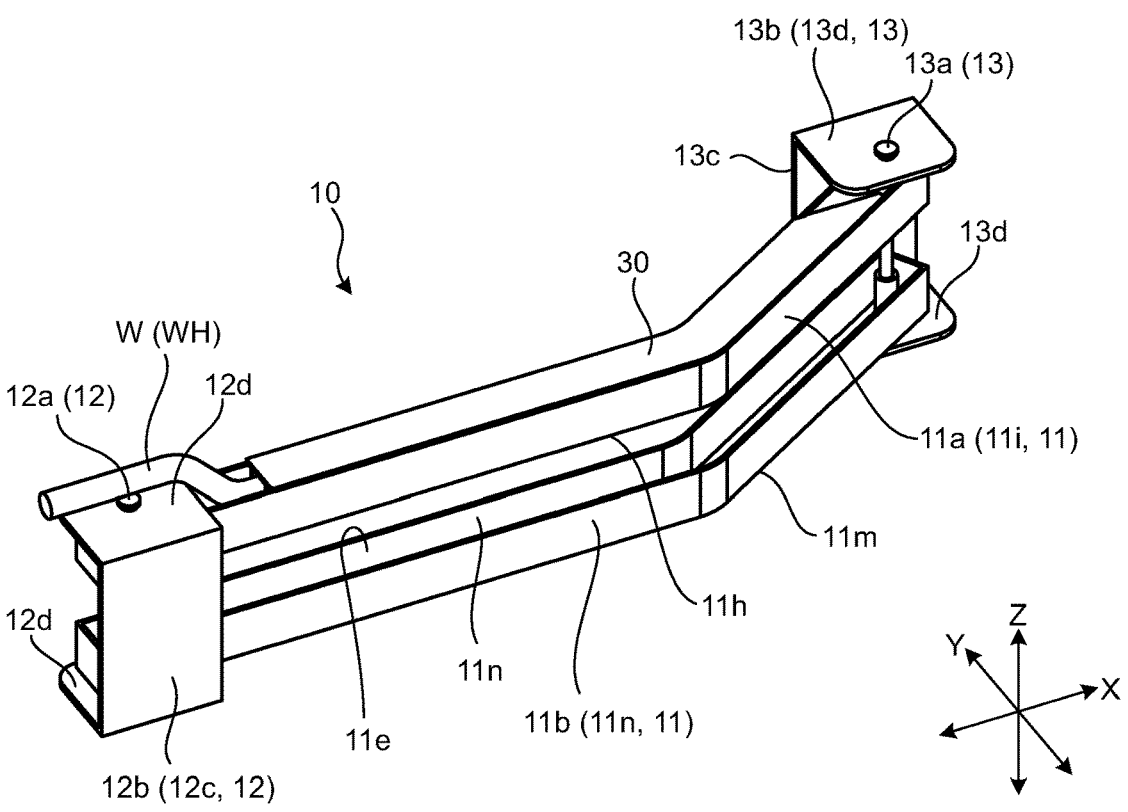
FIG. 2 is a perspective view illustrating a configuration example of a main link mechanism according to an embodiment.

Next, the first connection portion 12 will be described. As illustrated in FIG. 2, the first connection portion 12 rotatably connects one end in the extending direction X of the main link arm 11 to the vehicle body B, and includes the rotational axis portion 12*a* and a bearing portion 12*b*.

The rotational axis portion 12a rotatably supports one end in the extending direction X of the main link arm 11. The rotational axis portion 12a is formed into a stick-like shape, extends along the height direction Z, and is inserted into a hole portion (cylindrical hole portion) at one end in the extending direction X of the main link arm 11. Specifically, the rotational axis portion 12a is inserted into a hole portion at one end in the extending direction X of the first arm 11a and a hole portion at one end in the extending direction X of the second arm 11b in the main link arm 11. The rotational axis portion 12a is provided with a stopper (not illustrated in the drawing) for keeping an interval between the first arm 11a and the second arm 11b constant in the height direction Z. This stopper prevents the first arm 11a and the second arm 11b from generating a positional shift in the height direction Z. The rotational axis portion 12a extending along the height direction Z supports one end of the first arm 11a and one end of the second arm 11b in such a manner as to be rotatable around the rotational axis portion 12a. Note that the configuration of preventing the first arm 11a and the second arm 11b from generating a positional shift may be a configuration other than the above-described stopper.

The bearing portion 12b connects the rotational axis portion 12a to the vehicle body B. The bearing portion 12b includes a fix plate 12c and a pair of support plates 12d.

The fix plate 12c is a portion to be fixed to the vehicle body B. The fix plate 12c is formed into a plate-like shape, extends along the height direction Z, and is fixed to the vehicle body B.

The pair of support plates 12d support the rotational axis portion 12a. The pair of support plates 12d are each formed into a plate-like shape, erect along the width direction Y from both ends in the height direction Z of the fix plate 12c, and are positioned along the height direction Z at a fixed interval. The rotational axis portion 12a is provided between one support plate 12d and a different support plate 12d of the pair of support plates 12d. The pair of support plates 12d each include a hole portion for inserting the rotational axis portion 12a, and one end of the rotational axis portion 12a is inserted into the hole portion of one support plate 12d, and a different end of the rotational axis portion 12a is inserted into the hole portion of a different support plate 12d. Retaining portions are provided at both end portions of the rotational axis portion 12a inserted into the pair of support plates 12d. In the bearing portion 12b having the aforementioned configuration, in a state in which both ends of the rotational axis portion 12a inserted into the first arm 11a and the second arm 11b are supported by the pair of support plates 12d, the fix plate 12c is fixed to the vehicle body B.

Next, the second connection portion 13 will be described. As illustrated in FIG. 2, the second connection portion 13 rotatably connects a different end in the extending direction X of the main link arm 11 to the door main body D, and is formed similarly to the first connection portion 12. More specifically, the second connection portion 13 includes a rotational axis portion 13a and a bearing portion 13b.

The rotational axis portion 13a rotatably supports the different end in the extending direction X of the main link arm 11. The rotational axis portion 13a is formed into a stick-like shape, extends along the height direction Z, and is inserted into a hole portion (cylindrical hole portion) at the different end in the extending direction X of the main link arm 11. Specifically, the rotational axis portion 13a is inserted into a hole portion at the different end in the extending direction X of the first arm 11a and a hole portion at the different in the extending direction X of the second arm 11b in the main link arm 11. The rotational axis portion 13a is provided with a stopper (not illustrated in the drawing) for keeping an interval between the first arm 11a and the second arm 11b constant in the height direction Z. This stopper prevents the first arm 11a and the second arm 11b from generating a positional shift in the height direction Z. The rotational axis portion 13a extending along the height direction Z supports the different end of the first arm 11a and the different end of the second arm 11b in such a manner as to be rotatable around the rotational axis portion 13a. Note that the configuration of preventing the first arm 11a and the second arm 11b from generating a positional shift may be a configuration other than the above-described stopper.

The bearing portion 13b connects the rotational axis portion 13a to the door main body D. The bearing portion 13b includes a fix plate 13c and a pair of support plates 13d.

The fix plate 13c is a portion to be fixed to the door main body D. The fix plate 13c is formed into a plate-like shape, extends along the height direction Z, and is fixed to the door main body D.

The pair of support plates 13d support the rotational axis portion 13a. The pair of support plates 13d are each formed into a plate-like shape, erect along the width direction Y from both ends in the height direction Z of the fix plate 13c, and are positioned along the height direction Z at a fixed interval. The rotational axis portion 13a is provided between one support plate 13d and a different support plate 13d of the pair of support plates 13d. The pair of support plates 13d each include a hole portion for inserting the rotational axis portion 13a, and one end of the rotational axis portion 13a is inserted into the hole portion of one support plate 13d, and a different end of the rotational axis portion 13a is inserted into the hole portion of a different support plate 13d. Retaining portions are provided at both end portions of the rotational axis portion 13a inserted into the pair of support plates 13d. In the bearing portion 13b having the aforementioned configuration, in a state in which both ends of the rotational axis portion 13a inserted into the first arm 11a and the second arm 11b are supported by the pair of support plates 13d, the fix plate 13c is fixed to the door main body D.

The main link arm 11 having the aforementioned configuration slidably supports the door main body D along the slide direction S with respect to the vehicle body B together with the sub link mechanism 20 while relatively rotating with respect to the vehicle body B and the door main body D.

Next, the sub link mechanism 20 will be described. The sub link mechanism 20 is provided adjacently to the main link mechanism 10 along the height direction Z. In this example, the sub link mechanism 20 is provided on the lower side in the height direction Z of the main link mechanism 10, and slidably supports the door main body D with respect to the vehicle body B together with the main link mechanism 10. The sub link mechanism 20 includes the sub link arm 21, a first connection portion 22, and a second connection portion 23.

Figure 3:
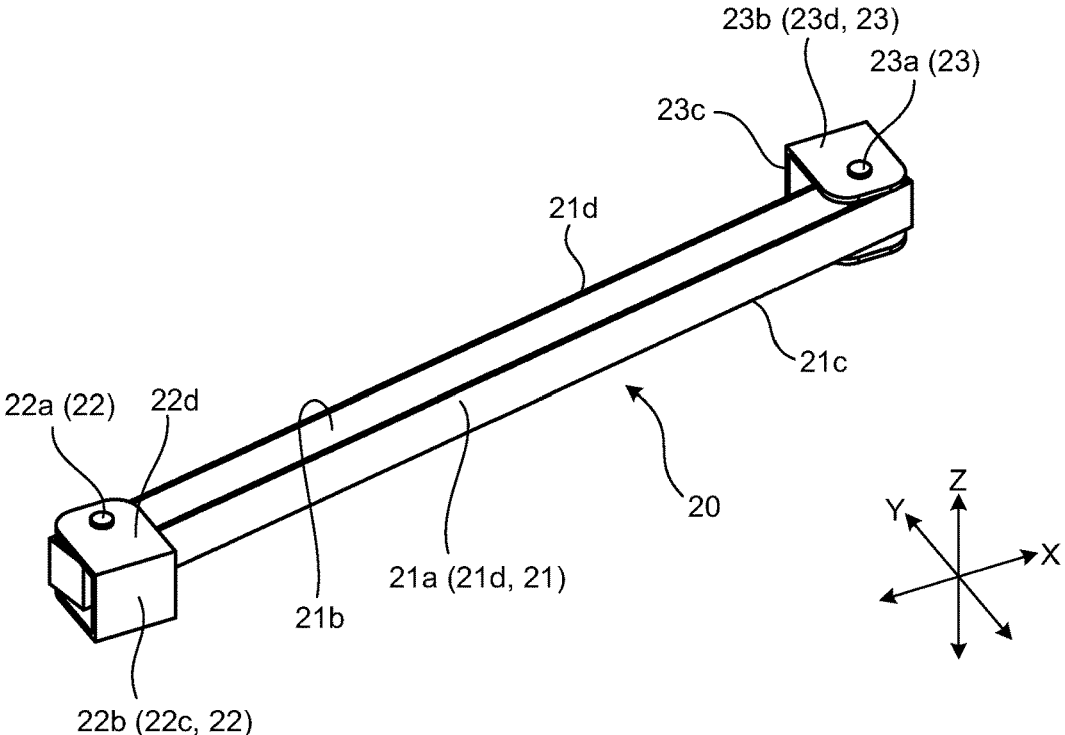
FIG. 3 is a perspective view illustrating a configuration example of a sub link mechanism according to an embodiment.

The sub link arm 21 is provided adjacently to the main link arm 11 along the height direction Z, and includes a first arm 21a as illustrated in FIG. 3.

The first arm 21a is a metal member extending in the extending direction X and being formed into an elongated shape. The first arm 21a is formed into a linear shape along the extending direction X, for example. Note that the shape of the first arm 21a is not limited to such a linear shape as long as the first arm 21a can slidably support the door main body D with respect to the vehicle body B. The first arm 21a includes a bottom surface portion 21c and a pair of side wall portions 21*d*. The bottom surface portion 21*c* is a portion positioned on one side (lower side) in the height direction Z, and is formed into an elongated shape and a plate-like shape along the extending direction X. The pair of side wall portions 21*d* are each formed into an elongated shape and a plate-like shape along the extending direction X, erect along the height direction Z from both ends in the width direction Y of the bottom surface portion 21*c*, and are positioned along the width direction Y at a fixed interval. A different side (upper side) in the height direction Z of the bottom surface portion 21*c* of the first arm 21*a* is opened, and both end portions in the extending direction X are closed. The first arm 21*a* having such a configuration can accommodate the wire W to be wired between the vehicle body B side and the door main body D side, into a groove portion 21*b* formed by being surrounded by the bottom surface portion 21*c* and the pair of side wall portions 21*d*, which will be described later.

Next, the first connection portion 22 will be described. As illustrated in FIG. 3, the first connection portion 22 rotatably connects one end in the extending direction X of the sub link arm 21 to the vehicle body B, and includes a rotational axis portion 22*a* and a bearing portion 22*b*.

The rotational axis portion 22*a* rotatably supports one end in the extending direction X of the sub link arm 21. The rotational axis portion 22*a* is formed into a stick-like shape, extends along the height direction Z, and is inserted into a hole portion (cylindrical hole portion) at one end in the extending direction X of the sub link arm 21. Specifically, the rotational axis portion 22*a* is inserted into the hole portion at one end in the extending direction X of the first arm 21*a* in the sub link arm 21. The rotational axis portion 22*a* extending along the height direction Z supports one end of the first arm 21*a* in such a manner as to be rotatable around the rotational axis portion 22*a*.

The bearing portion 22*b* connects the rotational axis portion 22*a* to the vehicle body B. The bearing portion 22*b* includes a fix plate 22*c* and a pair of support plates 22*d*.

The fix plate 22*c* is a portion to be fixed to the vehicle body B. The fix plate 22*c* is formed into a plate-like shape, extends along the height direction Z, and is fixed to the vehicle body B.

The pair of support plates 22*d* support the rotational axis portion 22*a*. The pair of support plates 22*d* are each formed into a plate-like shape, erect along the width direction Y from both ends in the height direction Z of the fix plate 22*c*, and are positioned along the height direction Z at a fixed interval. The rotational axis portion 22*a* is provided between one support plate 22*d* and a different support plate 22*d* of the pair of support plates 22*d*. The pair of support plates 22*d* each include a hole portion for inserting the rotational axis portion 22*a*, and one end of the rotational axis portion 22*a* is inserted into the hole portion of one support plate 22*d*, and a different end of the rotational axis portion 22*a* is inserted into the hole portion of a different support plate 22*d*. Retaining portions are provided at both end portions of the rotational axis portion 22*a* inserted into the pair of support plates 22*d*. In the bearing portion 22*b* having the aforementioned configuration, in a state in which both ends of the rotational axis portion 22*a* inserted into the first arm 21*a* are supported by the pair of support plates 22*d*, the fix plate 22*c* is fixed to the vehicle body B.

Next, the second connection portion 23 will be described. As illustrated in FIG. 3, the second connection portion 23 rotatably connects a different end in the extending direction X of the sub link arm 21 to the door main body D, and is formed similarly to the first connection portion 22. More specifically, the second connection portion 23 includes a rotational axis portion 23*a* and a bearing portion 23*b*.

The rotational axis portion 23*a* rotatably supports the different end in the extending direction X of the sub link arm 21. The rotational axis portion 23*a* is formed into a stick-like shape, extends along the height direction Z, and is inserted into a hole portion (cylindrical hole portion) at the different end in the extending direction X of the sub link arm 21. Specifically, the rotational axis portion 23*a* is inserted into the hole portion at the different end in the extending direction X of the first arm 21*a* in the sub link arm 21. The rotational axis portion 23*a* extending along the height direction Z supports the different end of the first arm 21*a* in such a manner as to be rotatable around the rotational axis portion 23*a*.

The bearing portion 23*b* connects the rotational axis portion 23*a* to the door main body D. The bearing portion 23*b* includes a fix plate 23*c* and a pair of support plates 23*d*.

The fix plate 23*c* is a portion to be fixed to the door main body D. The fix plate 23*c* is formed into a plate-like shape, extends along the height direction Z, and is fixed to the door main body D.

The pair of support plates 23*d* support the rotational axis portion 23*a*. The pair of support plates 23*d* are each formed into a plate-like shape, erect along the width direction Y from both ends in the height direction Z of the fix plate 23*c*, and are positioned along the height direction Z at a fixed interval. The rotational axis portion 23*a* is provided between one support plate 23*d* and a different support plate 23*d* of the pair of support plates 23*d*. The pair of support plates 23*d* each include a hole portion for inserting the rotational axis portion 23*a*, and one end of the rotational axis portion 23*a* is inserted into the hole portion of one support plate 23*d*, and a different end of the rotational axis portion 23*a* is inserted into the hole portion of a different support plate 23*d*. Retaining portions are provided at both end portions of the rotational axis portion 23*a* inserted into the pair of support plates 23*d*. In the bearing portion 23*b* having the aforementioned configuration, in a state in which both ends of the rotational axis portion 23*a* inserted into the first arm 21*a* are supported by the pair of support plates 23*d*, the fix plate 23*c* is fixed to the door main body D.

The sub link arm 21 having the aforementioned configuration slidably supports the door main body D with respect to the vehicle body B together with the main link arm 11 while relatively rotating with respect to the vehicle body B and the door main body D.

As a structure of wiring the wire W to the aforementioned link type slide door SD, the wire harness wiring structure 1 includes the groove portions 11*d* and 11*e* provided on the main link arm 11, the groove portion 21*b* provided on the sub link arm 21, the cover portion 30, and the binding member 40.

The groove portion 11*d* is a region provided on the first arm 11*a* of the main link arm 11, and formed by being surrounded by the bottom surface portion 11*h* and the pair of side wall portions 11*i* of the first arm 11*a*. The groove portion 11*d* is formed into a groove shape along the extending direction X in the first arm 11*a*, and the cross-section of the groove portion 11*d* is formed into a rectangular shape (refer to FIG. 5). The groove portion 11*d* includes an accommodation space portion that can accommodate the wire W, and can accommodate the wire W to be wired along the first arm 11*a* between the vehicle body B side and the door main body D side, into the accommodation space portion. In this example, an example in which the wire W is actually accommodated in the accommodation space portion is illustrated.

The groove portion 11e is a region provided on the second arm 11b of the main link arm 11, and formed by being surrounded by the bottom surface portion 11m and the pair of side wall portions 11n of the second arm 11b. The groove portion 11e is formed into a groove shape along the extending direction X in the second arm 11b, and the cross-section of the groove portion 11e is formed into a rectangular shape (refer to FIG. 5). The groove portion 11e includes an accommodation space portion that can accommodate the wire W, and can accommodate the wire W to be wired along the second arm 11b between the vehicle body B side and the door main body D side, into the accommodation space portion. In this example, an example in which the wire W is not accommodated in the accommodation space portion is illustrated.

The groove portion 21b is a region provided on the first arm 21a of the sub link arm 21, and formed by being surrounded by the bottom surface portion 21c and the pair of side wall portions 21d of the first arm 21a. The groove portion 21b is formed into a groove shape along the extending direction X in the first arm 21a, and the cross-section of the groove portion 21b is formed into a rectangular shape. The groove portion 21b includes an accommodation space portion that can accommodate the wire W, and can accommodate the wire W to be wired along the first arm 21a between the vehicle body B side and the door main body D side, into the accommodation space portion. In this example, an example in which the wire W is not accommodated in the accommodation space portion is illustrated.

Figure 4:
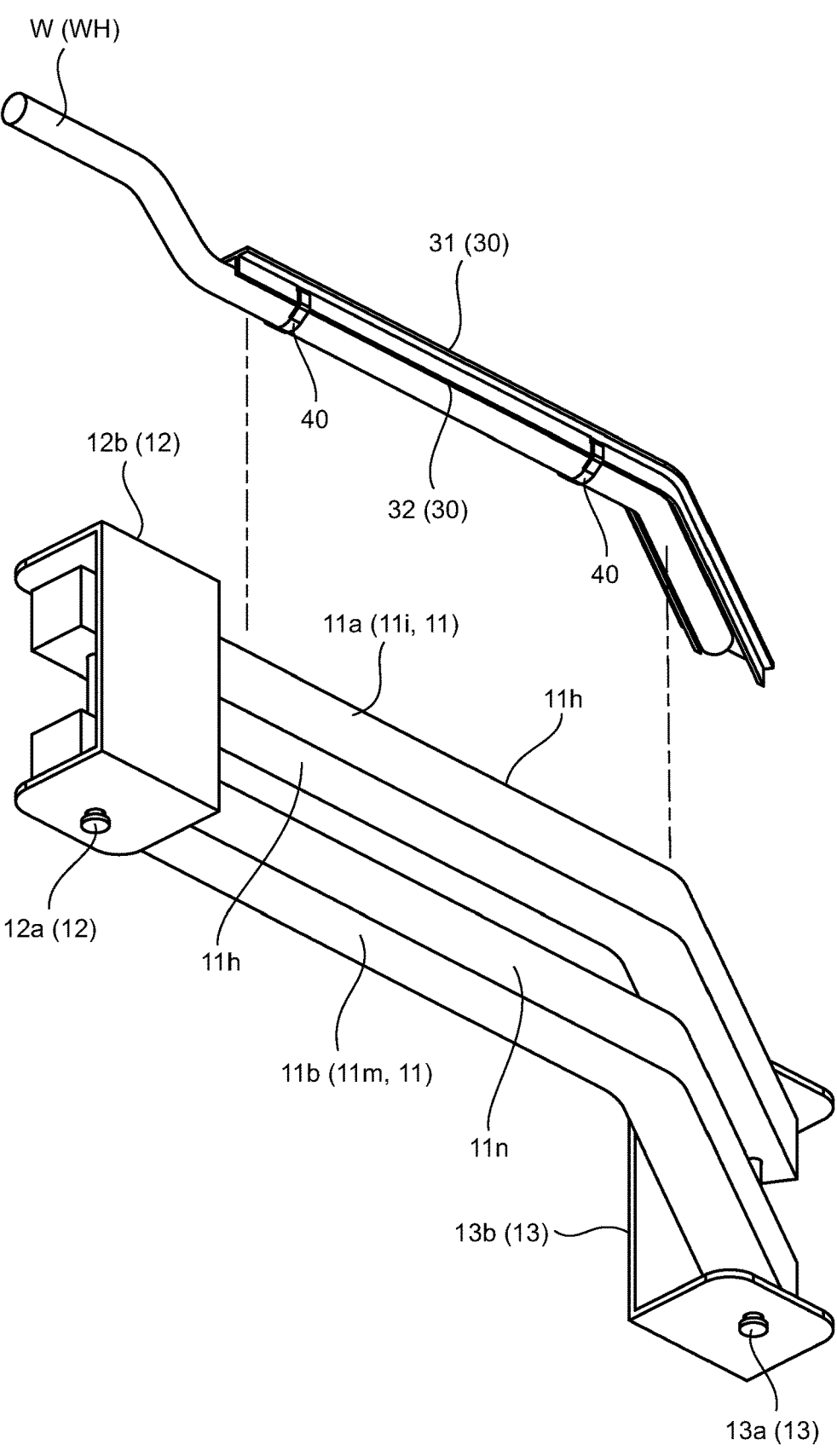
FIG. 4 is a perspective view illustrating an assembly example of a cover portion according to an embodiment.

Next, the cover portion 30 will be described. The cover portion 30 is a portion for closing an opening of the groove portion 11d of the main link arm 11, for example, and includes a closing portion 31 and a holding portion 32 as illustrated in FIG. 4.

The closing portion 31 closes an opening of the groove portion 11d, is formed into an elongated shape and a plate-like shape along the extending direction X, and is formed to be slightly larger than the opening of the groove portion 11d. The closing portion 31 closes the opening of the groove portion 11d by covering the opening of the groove portion 11d along the height direction Z. In a state in which a portion for drawing out the wire W in the groove portion 11d that is accommodated in the groove portion 11d, to the outside, for example (i.e., a portion of the opening of the groove portion 11d) is opened, the closing portion 31 closes a remaining portion of the opening of the groove portion 11d. That is, the closing portion 31 does not close the portion for drawing out the wire W in the groove portion 11d to the outside. Specifically, in a state in which a portion for drawing out the wire W in the groove portion 11d toward the vehicle body B side on one side in the extending direction X of the groove portion 11d, and a portion for drawing out the wire W in the groove portion 11d toward the door main body D side on a different side in the extending direction X of the groove portion 11d are opened, the closing portion 31 closes a remaining portion of the opening of the groove portion 11d.

Figure 5:
FIG. 5 is a cross-sectional view illustrating a configuration example of a main link mechanism and a sub link mechanism according to an embodiment.
Figure 5:
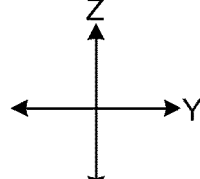

The holding portion 32 holds the wire W, and includes a pair of wall portions 32a (refer to FIG. 5). The pair of wall portions 32a are each formed into an elongated shape and a plate-like shape along the extending direction X, erect toward the groove portion 11d side along the height direction Z from both sides in the width direction Y of the closing portion 31 of the cover portion 30, and are positioned along the width direction Y at a fixed interval. An interval in the width direction Y between the wall portion 32a on one side and the wall portion 32a on a different side of the pair of wall portions 32a is equal to or smaller than a diameter of the wire W. By sandwiching the wire W between the wall portion 32a on one side and the wall portion 32a on a different side, the pair of wall portions 32a hold the wire W.

Next, the binding member 40 will be described. The binding member 40 is a member that fixes the wire W to the cover portion 30 by binding. The binding member 40 is formed into a belt-like shape as illustrated in FIG. 5, and is inserted along the width direction Y into a hole portion provided on the closing portion 31 side of the holding portion 32. Then, the binding member 40 is inserted into a clearance gap between the wire W held by the holding portion 32, and the closing portion 31, and the wire W is fixed to the holding portion 32 by binding the holding portion 32 and the wire W by the inserted binding member 40. The binding members 40 are provided at two points at a fixed interval along the extending direction X of the cover portion 30, and fix the wire W to the holding portion 32 on one side in the extending direction X of the cover portion 30 and a different side in the extending direction X of the cover portion 30.

As mentioned above, the wire harness WH includes the wire W, the cover portion 30, and the binding member 40, and is wired over the vehicle body B and the door main body D by being assembled to the groove portion 11d of the main link arm 11 of the vehicle body B in a state in which the wire W, the cover portion 30, and the binding member 40 are assembled to each other, for example. With this configuration, the wire harness WH improves assembly workability with respect to the vehicle body B. That is, here, the cover portion 30 is assembled to the groove portion 11d of the first arm 11a in a state in which the wire W is held by the holding portion 32 and the wire W is fixed to the holding portion 32 by the binding member 40. At this time, the cover portion 30 is fixed to the groove portion 11d by an engagement portion (not illustrated in the drawing) provided on the cover portion 30, being engaged with an engaged portion (not illustrated in the drawing) provided on the groove portion 11d, for example. Then, the wire W is accommodated into the accommodation space portion of the groove portion 11d of the first arm 11a, wired along the first arm 11a in a state in which the opening of the groove portion 11d is closed by the cover portion 30, and electrically connects the connection target BC1 on the vehicle body B side and the connection target DC1 on the door main body D side.

In the wire harness wiring structure 1 having the afore-mentioned configuration, the main link arm 11 is rotated by a drive unit (not illustrated in the drawing) including a motor or the like that is provided in the vehicle body B, for example. The drive unit is connected to a rotational axis of the main link arm 11 via a gear or the like that transmits rotational force, for example, and rotates the main link arm 11 by rotating the rotational axis. By the main link arm 11 being rotated by the drive unit, the main link arm 11 and the sub link arm 21 relatively rotate with respect to the vehicle body B and the door main body D, and the wire harness wiring structure 1 moves the door main body D in a sliding manner along the slide direction S with respect to the vehicle body B from a fully-closed position to a fully-opened position, or from the fully-opened position to the fully-closed position. That is, by being rotated by the drive unit, the main link arm 11 relatively rotates with respect to the vehicle body B and the door main body D using the rotational axis portion 12a of the first connection portion 12 and the rotational axis portion 13a of the second connection portion 13 as rotational axes. At this time, by the main link arm 11 being rotated by the drive unit, the sub link arm 21 relatively rotates with respect to the vehicle body B and the door main body D using the rotational axis portion 22a of the first connection portion 22 and the rotational axis portion 23a of the second connection portion 23 as rotational axes. Then, the wire W wired along the main link arm 11 and accommodated in the accommodation space portion of the groove portion 11d electrically connects the connection target BC1 on the vehicle body B side and the connection target DC1 on the door main body D side also while the main link arm 11 is rotating.

As described above, the wire harness wiring structure 1 according to an embodiment includes at least the main link arm 11 and the wire W. The main link arm 11 has one end rotatably connected to the vehicle body B and a different end rotatably connected to the door main body D, and slidably supports the door main body D with respect to the vehicle body B while relatively rotating with respect to the vehicle body B and the door main body D. The wire W is wired along the main link arm 11, and connects a connection target on the vehicle body B side and a connection target on the door main body D side. Then, the main link arm 11 includes the groove portion 11d that is formed into a groove shape along the extending direction X in which the main link arm 11 extends, and can accommodate the wire W.

With this configuration, the wire harness wiring structure 1 can ensure a wiring space for wiring the wire W between the vehicle body B and the door main body D, by the groove portion 11d of the main link arm 11. Furthermore, by wiring the wire W to be wired between the vehicle body B and the door main body D, with being accommodated in the groove portion 11d of the main link arm 11, the wire harness wiring structure 1 can prevent the wire W from being exposed to the outside, and can prevent the wire W from getting snagged, as compared with a case where the wire W is exposed to the outside as in the conventional case. Consequently, the wire harness wiring structure 1 can properly wire the wire W between the vehicle body B and the door main body D.

The wire harness wiring structure 1 further includes the cover portion 30 that closes an opening on the side in the height direction Z intersecting with the extending direction X of the groove portion 11d. With this configuration, the wire harness wiring structure 1 closes the opening of the groove portion 11d using the cover portion 30 in a state in which the wire W is accommodated in the groove portion 11d of the main link arm 11. It is therefore possible to protect the wire W. In addition, the wire harness wiring structure 1 can hide the wire W from the outside using the cover portion 30, and achieve better looking. In addition, by applying elaborations to the cover portion 30 of the main link arm 11, the wire harness wiring structure 1 can omit the additional application of elaborations to the main link arm 11.

In the wire harness wiring structure 1, the cover portion 30 includes the closing portion 31 that closes the opening of the groove portion 11d, and the holding portion 32 that is provided in the closing portion 31, and holds the wire W. With this configuration, the wire harness wiring structure 1 can wire the wire W with being accommodated in the groove portion 11d, by assembling the cover portion 30 in a state of holding the wire W by the holding portion 32, to the groove portion 11d of the main link arm 11. That is, the wire harness wiring structure 1 can simultaneously perform a work of closing the opening of the groove portion 11d, and a work of wiring the wire W with being accommodated in the groove portion 11d.

The wire harness wiring structure 1 further includes the binding member 40 that is formed into a belt-like shape, and fixes the wire W to the cover portion 30 by binding the cover portion 30 and the wire W. With this configuration, the wire harness wiring structure 1 can maintain the state in which the wire W is fixed to the cover portion 30, even after the wire W is wired with being accommodated in the groove portion 11d, and prevent the wire W from rattling in the groove portion 11d due to the vibration generated when the door main body D is opened or closed.

The link type slide door SD includes the door main body D to be assembled to the vehicle body B, the main link arm 11, and the wire W, and the main link arm 11 includes the groove portion 11d that is formed into a groove shape along the extending direction X in which the main link arm 11 extends, and can accommodate the wire W. With this configuration, the link type slide door SD can ensure a wiring space for wiring the wire W between the vehicle body B and the door main body D, by the groove portion 11d of the main link arm 11, and properly wire the wire W between vehicle body B and the door main body D.

The wire harness WH includes the wire W that is wired along the main link arm 11, connects the connection target BC1 on the vehicle body B side and the connection target DC1 on the door main body D side, and is accommodated into the groove portion 11d of the main link arm 11 that is formed into a groove shape along the extending direction X. With this configuration, the wire harness WH can properly wire the wire W between the vehicle body B and the door main body D by the wire W being accommodated into the groove portion 11d of the main link arm 11.

Modified Example

The description has been given of an example in which the wire harness wiring structure 1 includes the cover portion 30 that closes the opening on the height direction Z side of the groove portion 11d, but the configuration is not limited to this, and the wire harness wiring structure 1 need not always include the cover portion 30.

The description has been given of an example in which the cover portion 30 includes the holding portion 32 that holds the wire W, but the configuration is not limited to this, and the cover portion 30 need not always include the holding portion 32.

The description has been given of an example in which the wire harness wiring structure 1 includes the binding member 40 that fixes the wire W to the cover portion 30, but the configuration is not limited to this, and the wire harness wiring structure 1 need not always include the binding member 40.

The description has been given of an example in which the wire harness wiring structure 1 includes a drive unit, and by the main link arm 11 being rotated by the drive unit, the main link arm 11 and the sub link arm 21 relatively rotate with respect to the vehicle body B and the door main body D, but the configuration is not limited to this. For example, the drive unit need not be always included, and the main link arm 11 and the sub link arm 21 may relatively rotate with respect to the vehicle body B and the door main body D by a slide operation of the door main body D that is performed by an occupant of a vehicle.

The description has been given of an example in which the groove portions 11d, 11e, and 21b are formed to have rectangular cross-sections, but the configuration is not limited to this. For example, the groove portions 11d, 11e, and 21*b* may be formed to have U-shaped, C-shaped, H-shaped cross-sections, or the like in which bottom surfaces are curved.

The description has been given of an example in which the bottom surface portion 11*h* of the groove portion 11*d* is positioned on one side (lower side) in the height direction Z, and a different side (upper side) in the height direction Z of the bottom surface portion 11*h* is opened, but the configuration is not limited to this. For example, the bottom surface portion 11*h* may be positioned on one side in the width direction Y, and a different side in the width direction Y of the bottom surface portion 11*h* may be opened. In this case, the pair of side wall portions 11*i* are provided on both sides in the height direction Z. The same applies to the groove portions 11*e* and 21*b*, and the bottom surface portions 11*m* and 21*c* may be each positioned on one side in the width direction Y, and a different side in the width direction Y of each of the bottom surface portions 11*m* and 21*c* may be opened. In this case, the pair of side wall portions 11*n* or 21*d* are provided on both sides in the height direction Z.

The description has been given of an example in which the main link arm 11 rotates using the rotational axis portions 12*a* and 13*a* at both ends of one arm member as rotational axes, but the configuration is not limited to this. For example, an arm may be divided in the extending direction X, and divided arms may be connected using a link. In this case, it is sufficient that groove portions are formed in the respective divided arms, the groove portions continue over the respective divided arms, and the wire W is wired in the groove portions continuous over the respective divided arms.

The description has been given of an example in which the sub link arm 21 rotates using the rotational axis portions 22*a* and 23*a* at both ends of one arm member as rotational axes, but the configuration is not limited to this. For example, an arm may be divided in the extending direction X, and divided arms may be connected using a link. In this case, it is sufficient that groove portions are formed in the respective divided arms, the groove portions continue over the respective divided arms, and the wire W is wired in the groove portions continuous over the respective divided arms.

The description has been given of an example in which the wire harness wiring structure 1 includes two link mechanisms corresponding to the main link mechanism 10 and the sub link mechanism 20, but the configuration is not limited to this, and the wire harness wiring structure 1 may include one link mechanism (for example, mechanism including the main link mechanism 10 without including the sub link mechanism 20).

The description has been given of an example in which the main link mechanism 10 wires the wire W to the first arm 21*a*, and does not wire the wire W to the second arm 11*b*, but the configuration is not limited to this, and the wire W may also be wired to the second arm 11*b*. In this case, in a state in which the wire W is accommodated in the groove portion 11*e* of the second arm 11*b*, the opening of the groove portion 11*e* of the second arm 11*b* is closed by the cover portion 30.

The description has been given of an example in which the sub link mechanism 20 does not wire the wire W to the first arm 21*a*, but the configuration is not limited to this, and the wire W may be wired to the first arm 21*a*. In this case, in a state in which the wire W is accommodated in the groove portion 21*b* of the first arm 21*a*, the opening of the groove portion 21*b* of the first arm 21*a* is closed by the cover portion 30.

The wire harness wiring structure and the link type slide door according to the present embodiments can ensure a wiring space for wiring the wire between the vehicle body and the door main body, by the groove portion of the link arm. Accordingly, it is possible to properly wire the wire. In addition, the wire harness according to the present invention includes the wire accommodated in the groove portion of the link arm. It is therefore possible to properly wire the wire.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness wiring structure comprising:
a link arm that has one end rotatably connected to a vehicle body and a different end rotatably connected to a door main body, and slidably supports the door main body with respect to the vehicle body while relatively rotating with respect to the vehicle body and the door main body;
a wire that is wired along the link arm and connects a connection target on the vehicle body side and a connection target on the door main body side; and
a cover portion that covers an opening of a groove portion of the link arm on an intersecting direction side intersecting with a longitudinal direction in which the link arm extends, wherein
the groove portion is formed into a groove shape by being surrounded by a bottom surface portion and a pair of side wall portions and that is formed along the longitudinal direction in which the link arm extends and accommodates the wire, and
a portion of the wire accommodated in the groove shape is exposed to an outside of the groove portion via the opening of the groove portion at opposing ends of the cover portion.

2. The wire harness wiring structure according to claim 1, wherein
the cover portion includes a closing portion that covers the opening of the groove portion, and a holding portion provided in the closing portion that holds the wire.

3. The wire harness wiring structure according to claim 2, further comprising:
a binding member that is formed into a belt-like shape, and fixes the wire to the cover portion by binding the cover portion and the wire.

4. The wire harness wiring structure according to claim 1, further comprising:
a binding member that is formed into a belt-like shape, and fixes the wire to the cover portion by binding the cover portion and the wire.

5. The wire harness wiring structure according to claim 4, wherein the binding member comprises a first binding member and a second binding member provided at a fixed interval along a longitudinal direction of the cover portion.

6. The wire harness wiring structure according to claim 1, wherein a width of the groove shape is constant along the extending direction of the link arm.

7. A link type slide door comprising:
a door main body to be assembled to a vehicle body;
a link arm that has one end rotatably connected to the vehicle body and a different end rotatably connected to the door main body, and slidably supports the door main body with respect to the vehicle body while relatively rotating with respect to the vehicle body and the door main body;

a wire that is wired along the link arm and connects a connection target on the vehicle body side and a connection target on the door main body side; and a cover portion that covers an opening of a groove portion of the link arm on an intersecting direction side intersecting with a longitudinal direction in which the link arm extends, wherein the groove portion is formed into a groove shape by being surrounded by a bottom surface portion and a pair of side wall portions and that is formed along the longitudinal direction in which the link arm extends and accommodates the wire, and a portion of the wire accommodated in the groove shape is exposed to an outside of the groove portion via the opening of the groove portion at opposing ends of the cover portion.

8. A wire harness comprising:

a wire that is wired along a link arm that has one end rotatably connected to a vehicle body and a different end rotatably connected to a door main body, and that slidably supports the door main body with respect to the vehicle body while relatively rotating with respect to the vehicle body and the door main body, the wire connecting a connection target on the vehicle body side and a connection target on the door main body side, and being accommodated into a groove portion of the link arm that is formed into a groove shape by being surrounded by a bottom surface portion and a pair of side wall portions and that is formed along an longitudinal direction of the link arm; and a cover portion that covers an opening of the groove portion on an intersecting direction side intersecting with the longitudinal direction of the link arm, wherein a portion of the wire accommodated in the groove shape is exposed to an outside of the groove portion via the opening of the groove portion at opposing ends of the cover portion.

\* \* \* \* \*